A. LANZ.
YIELDING COUPLING.
APPLICATION FILED JULY 26, 1920.
1,376,774.
Patented May 3, 1921.
2 SHEETS—SHEET 1.
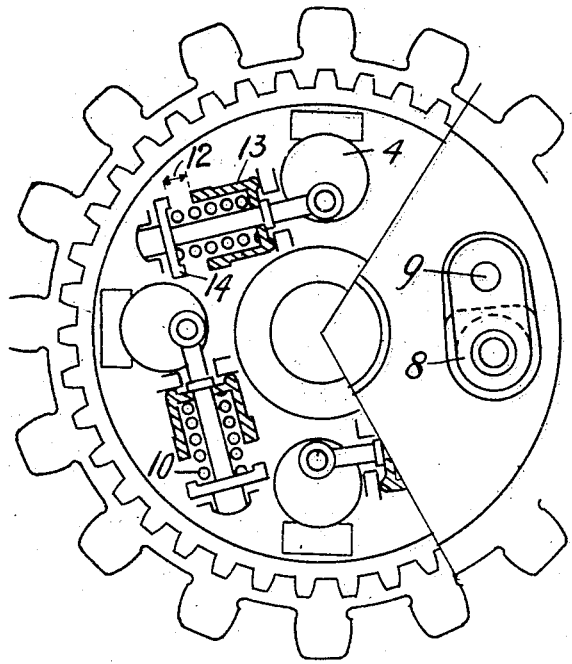
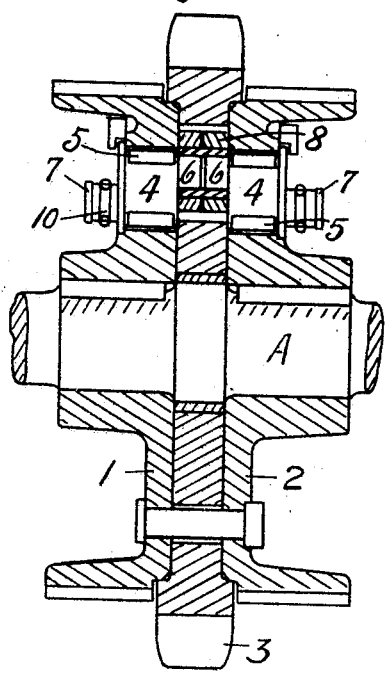
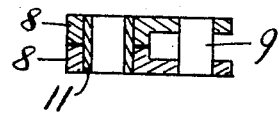
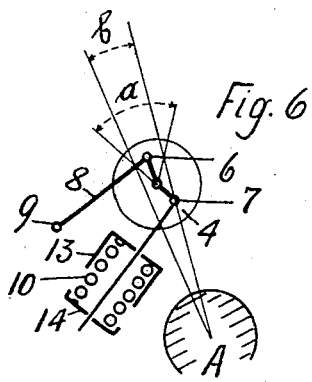
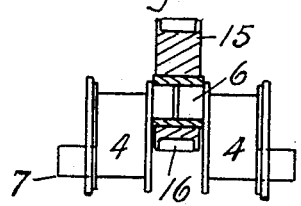
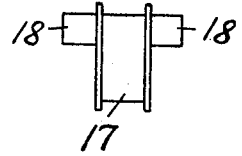
INVENTOR
Arthur Lanz.

A. LANZ.
YIELDING COUPLING.
APPLICATION FILED JULY 26, 1920.
1,376,774.
Patented May 3, 1921.
2 SHEETS—SHEET 2.
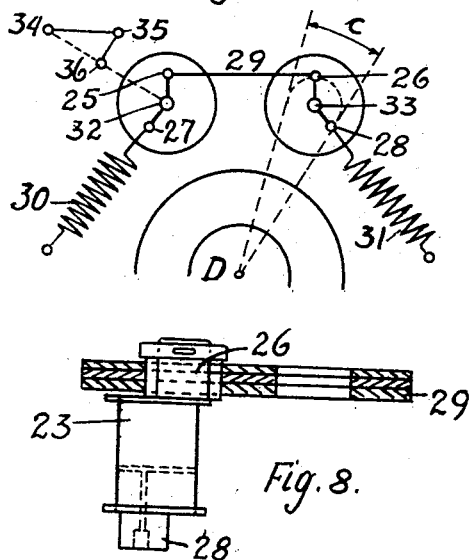
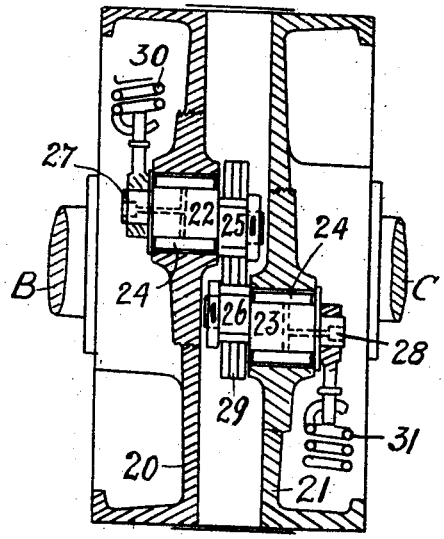
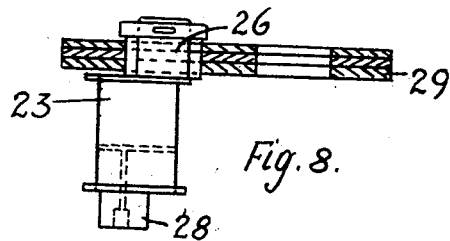
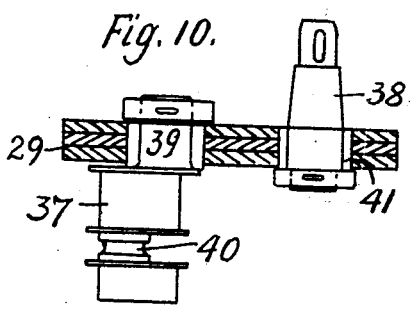
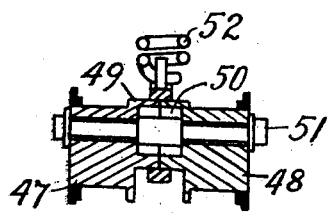
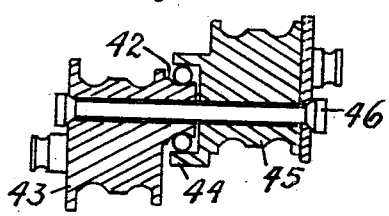
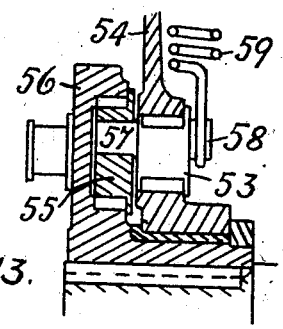
INVENTOR
Arthur Lanz
BY
ATTORNEY

UNITED STATES PATENT OFFICE.

ARTHUR LANZ, OF YOUNGSTOWN, OHIO.

YIELDING COUPLING.

1,376,774.  Specification of Letters Patent.  Patented May 3, 1921.

Application filed July 26, 1920. Serial No. 399,153.

*To all whom it may concern:*

Be it known that I, ARTHUR LANZ, a citizen of Switzerland, and a resident of Youngstown, Mahoning county, State of Ohio, have invented a certain new and useful Improvement in Yielding Couplings, of which the following is a full and clear specification.

My invention relates to yielding couplings particularly adapted for drives with variable loads and has for its object to provide a combination, which requires comparatively small space, gives great and variable yields, whereby the yielding means are protected against crystallizing and crushing at overloads. The yielding coupling comprises driving and driven coupling members, yielding elements on roller bearings carried by the coupling members, suitable connections between the yielding elements of the driving and the driven coupling members and means to regulate the yield.

In one of its preferred forms the driving and the driven coupling members are carrying yielding elements.

In another form one coupling member only is provided with yielding elements. In another form the driving and the driven coupling members are carrying alternately yielding elements and fixed elements, the yielding elements of one coupling member being connected to a fixed element of the other coupling member.

While the yielding coupling may be used for a great variety of purposes, it is specially suitable in drives sustaining shocks, overloads, sudden changes in power and kinetic energy. Additional objects of the invention will appear in the following specification in which some of the preferred forms of my invention are described.

Referring to the drawings in which similar reference characters indicate the same parts in the several figures of the drawing.

Figure 1 is a longitudinal section of one form of my yielding coupling; Fig. 2 is a side view of Fig. 1, partly broken away to show coupling details: Fig. 3 shows a detail of a coupling link; Figs. 4 and 5 are details of yielding elements; Fig. 6 is a working diagram for coupling shown in Figs. 1 and 2; Fig. 7 is a vertical longitudinal section of another form of my improved yielding coupling, part of the section being broken away to show details of the yielding units; Fig. 8 is a detail of a yielding unit; Fig. 9 is a working diagram for coupling shown in Fig. 7; Figs. 10, 11, 12 and 13 are details of other forms of yielding units.

Referring now to Figs. 1, 2 and 3, two coupling members 1 and 2 are keyed to shaft A, a third coupling member 3 is freely journaled thereon. Coupling members 1 and 2 carry yielding elements 4 on roller bearings. One face of each yielding element is provided with a coupling pin 6, the other face with a regulating pin 7 at a certain distance from the center.

Coupling pins 6 are connected by links 8 to pins 9, seated on coupling member 3. Regulating pins 7 engage helical springs seated on coupling members 1 and 2. Bushing 11 unites two coupling pins 6 and two links 8. Each pin 9 with two links 8, bushing 11, two yielding elements 4 and two helical springs 10 form an independent yielding unit. In the coupling shown in Figs. 1 and 2 four yielding units are provided. The revolving action of each yielding unit is limited. After a yield equal to the distance 12 Fig. 2, spring seat 13 stops on spring seat 14. In some other forms of couplings these stops are provided on the rotatable yielding element directly.

Coupling link 8 may be replaced by a rotatable element as shown in Fig. 4. The element 15 on roller bearings 16 is carried floating by coupling member 3 and engages coupling pins 6 directly.

Fig. 5 shows another form of yielding element. The element 17 is carried on roller bearings by coupling member 3. Coupling pins 18 engage yielding elements seated on the outside coupling members 1 and 2.

In coupling Fig. 1 the outer coupling members are keyed to the shaft. In other forms the driving and the driven coupling members both may be freely journaled on the shaft, or either one may be keyed on.

Referring to Fig. 6 the operation of the invention is as follows: The three coupling members revolve as a unity up to a certain load. If the difference in pull increases to a certain amount, the yielding elements 4 revolve against the pressure of the springs until the stop is reached. The total angular yield of the yielding elements is equal to angle $a$ and the angular yield of the coupling members 1 and 2 against coupling member 3 is equal to angle $b$.

The coupling in the form described may be designed for one direction of rotation, or for reversing.

The yielding coupling as shown in Figs. 1 to 6 is specially useful in rack drives with severally applied rackwheels. It allows for pitch differences of the rack and equalizes the tooth pressures.

In coupling shown in Fig. 7 shaft section B is carrying coupling member 20 and shaft section C coupling member 21. Distributed on a circular line of each coupling member are yielding elements 22 and 23, provided with roller bearings 24. Protruding from the yielding elements are coupling pins 25 and 26 and regulating pins 27 and 28. Link 29 engages coupling pins 25 and 26, regulating pins 27 and 28 connect to helical springs 30 and 31, seated on the coupling members.

Fig. 8 shows an enlarged detail of yielding element 23 with connecting pin 26, regulating pin 28 and laminated link 29. One or more helical springs may be used on each side. The yielding units are usually applied in pairs.

Coupling shown in Figs. 7 and 8 is for either direction of rotation. Its operation will be more easily understood from working diagram Fig. 9, whereby D is the center of shaft sections B and C, 32 is the center of yielding element 22 and 33 the center of yielding element 23. At no load the centers 32 and 33 are held at a distance approximately equal to the length of link 29. At the maximum yield the distance between 32 and 33 is equal to the length of link 29 plus or minus the distances 25—32 and 26—33. As the maximum yield corresponds to the maximum extension or compression of the springs, the spring device is protected against any undue load or destruction. The total angular deviation that the two coupling members 20 and 21 may twist against each other is C to each side. In the particular case shown the effect of the regulating spring is continuously changing with the relative position of the yielding units. In position 32—34 the pull in link 29 would be equal to the distance 34—35. To balance this pull the tension of the springs must be equal to the distance 35—36, thus smaller. This difference increases rapidly toward the end of the yield. The power transmission from the coupling pin to the cushioning spring is impeded by the friction of the rotatable yielding element. Roller bearings are provided for said yielding elements to increase the sensitiveness of the yielding device and to reduce destructive stresses resulting from said friction, during the transmission of shocks.

In some forms of couplings spring 30 may be set at different angles compared to springs 31. Also every yielding unit may be set different, thus enabling a regulation of the resistance along the path of the yield to suit various conditions of service.

Fig. 10 shows details of another form of a yielding unit, whereby yielding element 37 is carried by one coupling member, stud element 38 by the other coupling member. Connecting link 29 engages stud element 38 and pin 39. Pin 40 connects to the regulating device. On stud element 38 is a loose bushing 41. All stud elements of a coupling may be placed on one coupling member, or each coupling member may carry alternately stud elements and yielding elements.

Fig. 11 shows the details of another yielding unit. Pin 42 of yielding element 43 carried by one coupling member is provided with ball bearings and is protruding directly into suitable shaped face recesses of coupling pin 44 on yielding element 45 carried by the other coupling member. Bolt 46 is securing the yielding elements in position.

In the yielding unit shown in Fig. 12 yielding element 47 is carried by one coupling member and yielding element 48 by the other coupling member. Coupling pins 49 are provided with face recesses and roller bearings 50. Spring 52 engages the regulating device.

Fig. 13 shows another form of yielding units, specially useful for shaft ends, whereby one coupling member may be carried by the hub extension of the other coupling member. Yielding element 53 is carried by coupling member 54. The floating yielding element 55 is carried by coupling member 56. Coupling pin 57 of element 53 engages a suitable face recess of yielding element 55. Pin 58 connects to spring 59, seated on coupling member 54.

It will of course be understood, that the structure of the different forms of the yielding coupling may be otherwise modified within the scope of the appended claims.

Having thus described my invention, I claim as new and desire to secure by Letters Patent:

1. A yielding coupling comprising driving and driven coupling members, yielding elements carried by said coupling members to yield on axes approximately parallel to the axis of rotation, means provided for said yielding elements to reduce friction, suitable driving engagements between the yielding elements of the coupling members, flexible means interposed between the yielding elements and the coupling members to regulate the yield.

2. A yielding coupling comprising a plurality of coupling members, yielding elements carried by said coupling members, to yield on axes approximately parallel to the axis of rotation, suitable driving engagements to connect each yielding element of the driving coupling members to a yielding element of the driven coupling members so as to form yielding units, suitable flexible means interposed between each yielding unit and the coupling members to regulate the yield of each yielding unit independent from each other.

3. A yielding coupling comprising two coupling members engaging a third coupling member, yielding elements carried by the two coupling members to yield on axes approximately parallel to the axis of rotation, means provided for said yielding elements to reduce friction, suitable driving engagements between the yielding elements of said coupling members and the third coupling member to form yielding units, flexible means interposed between said yielding units and the coupling members to regulate the yield.

4. A yielding coupling comprising three side by side coupling members, yielding elements carried by the two outer coupling members to yield on axes approximately parallel to the axis of rotation, means provided for said yielding elements to reduce friction, coupling pins projecting laterally and out of center of said yielding elements into suitable openings of the third coupling member, bushings to engage two coupling pins facing each other, means to engage said bushings and the third coupling member, regulating pins projecting laterally and out of center of said yielding elements, helical springs interposed between the regulating pins and the outer coupling members to regulate the yield.

5. A yielding coupling comprising three side by side coupling members, yielding elements carried by said coupling members to yield on axes approximately parallel to the axis of rotation, means provided for said yielding elements to reduce friction, coupling pins projecting laterally and out of center from the yielding elements of the outside coupling members, whereby two opposing coupling pins engage suitable face recesses of a yielding element carried by the third coupling member to form yielding units, regulating pins projecting laterally and out of center from the yielding units, helical springs interposed between said regulating pins and the coupling members to regulate the yield.

6. A yielding coupling comprising three side by side coupling members, yielding elements carried by said coupling members to yield approximately parallel to the axis of rotation, means provided for said yielding elements to reduce friction, coupling pins projecting laterally and out of center from the yielding elements of the inside coupling member to engage suitable face recesses of yielding elements carried by the two other coupling members to form yielding units, regulating pins projecting laterally and out of center from the yielding units, helical springs interposed between said regulating pins and the coupling members to regulate the yield.

7. The combination of yielding couplings in multiple drives, whereby each drive is provided with a plurality of coupling members, yielding elements carried by said coupling members to yield on axes approximately parallel to the axis of rotation, suitable connections between the yielding elements of said coupling members, means to regulate the yield for the purpose of equalizing pressures and distances between the driving and the driven ends.

ARTHUR LANZ.